(12) United States Patent
Catherwood

(10) Patent No.: US 6,604,169 B2
(45) Date of Patent: Aug. 5, 2003

(54) MODULO ADDRESSING BASED ON ABSOLUTE OFFSET

(75) Inventor: Michael I. Catherwood, Pepperell, MA (US)

(73) Assignee: Microchip Technology Incorporated, Chandler, AZ (US)

( * ) Notice: Subject to any disclaimer, the term of this patent is extended or adjusted under 35 U.S.C. 154(b) by 222 days.

(21) Appl. No.: 09/870,445

(22) Filed: Jun. 1, 2001

(65) Prior Publication Data
US 2002/0194452 A1 Dec. 19, 2002

(51) Int. Cl.⁷ .................................................. G06F 12/06
(52) U.S. Cl. ....................................... 711/110; 711/217
(58) Field of Search ................................ 711/110, 220, 711/217

(56) References Cited

U.S. PATENT DOCUMENTS

| | | | |
|---|---|---|---|
| 3,781,810 A | 12/1973 | Downing | 712/228 |
| 4,398,244 A | 8/1983 | Chu et al. | 712/244 |
| 4,472,788 A | 9/1984 | Yamazaki | 708/209 |
| 4,481,576 A | 11/1984 | Bicknell | 711/217 |
| 4,488,252 A | 12/1984 | Vassar | 708/505 |
| 4,511,990 A | 4/1985 | Hagiwara et al. | 708/501 |
| 4,556,938 A | 12/1985 | Parker et al. | 712/241 |
| 4,626,988 A | 12/1986 | George | 712/241 |
| 4,730,248 A | 3/1988 | Watanabe et al. | 712/228 |
| 4,742,479 A * | 5/1988 | Kloker et al. | 708/491 |
| 4,782,457 A | 11/1988 | Cline | 708/205 |
| 4,800,524 A * | 1/1989 | Roesgen | 711/217 |
| 4,807,172 A | 2/1989 | Nukiyama | 708/209 |
| 4,829,420 A | 5/1989 | Stahle | 711/200 |
| 4,829,460 A | 5/1989 | Ito | 708/209 |
| 4,839,846 A | 6/1989 | Hirose et al. | 708/497 |
| 4,872,128 A | 10/1989 | Shimizu | 708/209 |
| 4,882,701 A | 11/1989 | Ishii | 712/241 |
| 4,941,120 A | 7/1990 | Brown et al. | 708/497 |
| 4,943,940 A | 7/1990 | New | 708/507 |
| 4,959,776 A | 9/1990 | Deerfield et al. | 711/217 |
| 4,977,533 A | 12/1990 | Miyabayashi et al. | 708/404 |
| 4,984,213 A | 1/1991 | Abdoo et al. | 365/230.03 |
| 5,007,020 A | 4/1991 | Inskeep | 711/200 |
| 5,012,441 A | 4/1991 | Retter | 711/217 |
| 5,032,986 A | 7/1991 | Pathak et al. | 711/217 |
| 5,038,310 A | 8/1991 | Akagiri et al. | 708/205 |
| 5,056,004 A | 10/1991 | Ohde et al. | 712/241 |
| 5,099,445 A | 3/1992 | Studor et al. | 708/209 |
| 5,101,484 A | 3/1992 | Kohn | 712/241 |
| 5,117,498 A | 5/1992 | Miller et al. | 712/241 |
| 5,122,981 A | 6/1992 | Taniguchi | 708/497 |
| 5,155,823 A | 10/1992 | Tsue | 711/217 |
| 5,197,023 A | 3/1993 | Nakayama | 708/505 |
| 5,197,140 A | 3/1993 | Balmer | 711/220 |
| 5,206,940 A | 4/1993 | Murakami et al. | 711/218 |
| 5,212,662 A | 5/1993 | Cocanougher et al. | 708/508 |
| 5,276,634 A | 1/1994 | Suzuki et al. | 708/497 |
| 5,282,153 A | 1/1994 | Bartkowiak et al. | 708/233 |
| 5,327,543 A | 7/1994 | Miura et al. | 712/224 |
| 5,327,566 A | 7/1994 | Forsyth | 710/260 |
| 5,379,240 A | 1/1995 | Byrne | 708/209 |
| 5,448,703 A | 9/1995 | Amini et al. | 710/110 |
| 5,448,706 A | 9/1995 | Fleming et al. | 711/217 |
| 5,463,749 A | 10/1995 | Wertheizer et al. | 711/10 |
| 5,469,377 A | 11/1995 | Amano | 708/497 |
| 5,471,600 A | 11/1995 | Nakamoto | 711/5 |
| 5,497,340 A | 3/1996 | Uramoto et al. | 708/552 |

(List continued on next page.)

Primary Examiner—David L. Robertson
(74) Attorney, Agent, or Firm—Swidler Berlin Shereff Friedman, LLP

(57) ABSTRACT

A hardware based modulo addressing scheme is described that is fast and makes efficient use of logic. The scheme uses a subtractor, multiplexers and AND/OR logic to produce modulo addresses to address, for example, a circular buffer in a memory. The buffer is defined by the user based on start and end addresses and an offset value. The offset may be positive or negative and may be greater than one.

18 Claims, 2 Drawing Sheets

U.S. PATENT DOCUMENTS

| | | | |
|---|---|---|---|
| 5,499,380 A | 3/1996 | Iwata et al. | 711/212 |
| 5,548,544 A | 8/1996 | Matheny et al. | 708/497 |
| 5,568,412 A | 10/1996 | Han et al. | 708/497 |
| 5,596,760 A | 1/1997 | Ueda | 712/241 |
| 5,600,813 A | 2/1997 | Nakagawa et al. | 711/217 |
| 5,619,711 A | 4/1997 | Anderson | 712/221 |
| 5,642,516 A | 6/1997 | Hedayat et al. | 710/260 |
| 5,649,146 A * | 7/1997 | Riou | 711/217 |
| 5,659,700 A * | 8/1997 | Chen et al. | 711/217 |
| 5,689,693 A | 11/1997 | White | 712/224 |
| 5,694,350 A | 12/1997 | Wolrich et al. | 708/497 |
| 5,696,711 A | 12/1997 | Makineni | 708/497 |
| 5,706,460 A | 1/1998 | Craig et al. | 712/204 |
| 5,715,470 A | 2/1998 | Asano et al. | 375/341 |
| 5,737,570 A | 4/1998 | Koch | 711/149 |
| 5,740,419 A | 4/1998 | Potter | 712/241 |
| 5,748,516 A | 5/1998 | Goddard et al. | 708/497 |
| 5,764,555 A | 6/1998 | McPherson et al. | 708/497 |
| 5,765,218 A * | 6/1998 | Ozawa et al. | 711/219 |
| 5,774,711 A | 6/1998 | Henry et al. | 712/244 |
| 5,778,416 A | 7/1998 | Harrison et al. | 711/5 |
| 5,790,443 A | 8/1998 | Shen et al. | 708/491 |
| 5,808,926 A | 9/1998 | Gorshtein et al. | 708/505 |
| 5,812,439 A | 9/1998 | Hansen | 708/497 |
| 5,825,730 A | 10/1998 | Nishida et al. | 369/44.32 |
| 5,826,096 A | 10/1998 | Baxter | 712/24 |
| 5,828,875 A | 10/1998 | Halvarsson et al. | 712/241 |
| 5,862,065 A | 1/1999 | Muthusamy | 708/521 |
| 5,880,984 A | 3/1999 | Burchfiel et al. | 708/501 |
| 5,892,697 A | 4/1999 | Brakefield | 708/496 |
| 5,892,699 A | 4/1999 | Duncan et al. | 708/628 |
| 5,894,428 A | 4/1999 | Harada | 708/306 |
| 5,909,385 A | 6/1999 | Nishiyama et al. | 708/630 |
| 5,917,741 A | 6/1999 | Ng | 708/497 |
| 5,918,252 A * | 6/1999 | Chen et al. | 711/217 |
| 5,930,159 A | 7/1999 | Wong | 708/550 |
| 5,930,503 A | 7/1999 | Drees | 713/1 |
| 5,938,759 A | 8/1999 | Kamijo | 712/209 |
| 5,941,940 A | 8/1999 | Prasad et al. | 708/523 |
| 5,943,249 A | 8/1999 | Handlogten | 708/496 |
| 5,951,627 A | 9/1999 | Kiamilev et al. | 708/404 |
| 5,951,679 A | 9/1999 | Anderson et al. | 712/241 |
| 5,983,333 A * | 11/1999 | Kolagotla et al. | 711/219 |
| 5,991,787 A | 11/1999 | Abel et al. | 708/400 |
| 5,996,067 A | 11/1999 | White | 712/224 |
| 6,009,454 A | 12/1999 | Dummermuth | 709/108 |
| 6,014,723 A | 1/2000 | Tremblay et al. | 711/1 |
| 6,026,489 A | 2/2000 | Wachi et al. | 712/241 |
| 6,044,392 A | 3/2000 | Anderson et al. | 708/551 |
| 6,044,434 A | 3/2000 | Oliver | 711/110 |
| 6,049,858 A * | 4/2000 | Kolagotla et al. | 711/217 |
| 6,058,409 A | 5/2000 | Kozaki et al. | 708/409 |
| 6,058,410 A | 5/2000 | Sharangpani | 708/551 |
| 6,058,464 A | 5/2000 | Taylor | 711/217 |
| 6,061,780 A | 5/2000 | Shippy et al. | 712/204 |
| 6,076,154 A | 6/2000 | Van Eijndhoven et al. | 712/24 |
| 6,101,521 A | 8/2000 | Kosiec | 708/550 |
| 6,115,732 A | 9/2000 | Oberman et al. | 708/625 |
| 6,128,728 A | 10/2000 | Dowling | 712/228 |
| 6,134,574 A | 10/2000 | Oberman et al. | 708/551 |
| 6,145,049 A | 11/2000 | Wong | 710/267 |
| 6,397,318 B1 * | 5/2002 | Peh | 711/220 |

* cited by examiner

US 6,604,169 B2

MODULO ADDRESSING BASED ON ABSOLUTE OFFSET

FIELD OF THE INVENTION

The present invention relates generally to memory address generation and, more particularly, to modulo address generation for accessing circular buffers.

BACKGROUND OF THE INVENTION

Circular buffers are used in a variety of useful applications to store data, such as coefficient data used in signal processing applications, for ordered retrieval.

Circular buffers may be implemented in a variety of ways in a variety of devices including processors, digital signal processors and digital signal controllers. One way is to use software program instructions to create a circular buffer within the memory of the device. The circular buffer may be addressed using modulo addressing This is typically done by designating space within the memory having upper and lower boundaries to be used as the buffer. The software then designates a current pointer to the memory which may be used for writing data into a memory location within the buffer specified by the pointer. The same or a separate pointer may be used to indicate a current memory location from which to read data.

During operation of a software-based modulo addressing scheme, the pointers are incremented (or decremented) after data is written into or read from a current location. The pointers are also checked against the upper and lower boundaries of the buffer. When any pointer falls outside of either the upper or lower boundary, the program causes that pointer to re-enter the buffer from the opposite side. To illustrate, when a pointer is incremented so that it specifies a memory location that is one or more locations below the lower boundary, the program changes the pointer value to specify the top of the buffer. When the pointer overflows the bottom boundary by more than one, the pointer is changed to the top of the buffer plus an offset that reflects the amount of overflow out the bottom.

In general, it is inefficient to implement circular buffers in software because of the software overhead associated with changing pointer values and generating "wrap around" addresses after an overflow. For this reason, modulo addressing schemes have been implemented in hardware on processor chips. These schemes have the advantage of being fast but the disadvantage or requiring additional circuitry on the processor to implement.

Various modulo addressing circuits and hardware schemes have been proposed. According to some schemes, when an overflow of the circular buffer occurs out of one side of the buffer, the amount of overflow is added to the length of the buffer and this sum is added to either the start or the end address depending on the side out of which the overflow occurred. In other schemes, comparators are implemented to check each proposed address against either or both of an upper or lower address value to determine when an overflow has occurred. In still other schemes, a current address is broken down into a base address and an offset value which is used to determine a position within a buffer.

There is a need for a new hardware based modulo addressing scheme that is hardware based and fast but requires only a small amount of logic to implement.

SUMMARY OF THE INVENTION

According to embodiments of the present invention, a hardware-based modulo addressing scheme that is fast and makes efficient use of logic is proposed. The scheme relies on a subtractor, multiplexers and AND/OR logic to produce modulo addresses to address, for example, a circular buffer in a memory. The buffer is defined by the user based on start and end addresses and an offset value. The offset may be positive or negative and may be greater than one.

According to one embodiment, a modulo addressing circuit includes registers, an adder, a subtractor, OR logic and a multiplexer. The registers store a pointer, an offset, an end address and a start address. The adder determines a sum of the pointer and the offset and the subtractor determines a carry and the difference between the sum and a selected one of the start and end addresses. The OR logic calculates a logical OR between the difference and the selected address. The multiplexer uses either the sum or the logical OR as the next modulo address based on the carry signal output by the subtractor.

The multiplexer may store the sum into the pointer when the carry signal does not indicate an overflow. The circuit may further include AND logic for calculating a logical AND between the difference and the selected address and a multiplexer for storing the logical AND into the pointer when the carry signal indicates an overflow out of the start address. A mode bit may determine the selected address as either the start or the end address.

According to another embodiment of the invention, a method of generating modulo addresses includes calculating a sum of a current address and an offset. A start address is subtracted from the sum to determine a difference and a carry. A logical OR is generated between the difference and the start address and either the sum or the logical OR is selected as a new current address based on the carry.

According to still another embodiment of the invention, a method of generating modulo addresses includes calculating a sum of a current address and an offset. An end address is subtracted from the sum to determine a difference and a carry. A logical AND is generated between the difference and the end address and either the sum or the logical AND is selected as a new current address based on the carry. The method may further include using the new current address to access a buffer within a memory. The method may further include saving the new current address as the current address.

BRIEF DESCRIPTION OF THE FIGURES

The above described features and advantages will be more fully appreciated with reference to the detailed description and figures in which.

DETAILED DESCRIPTION

Figure 1:
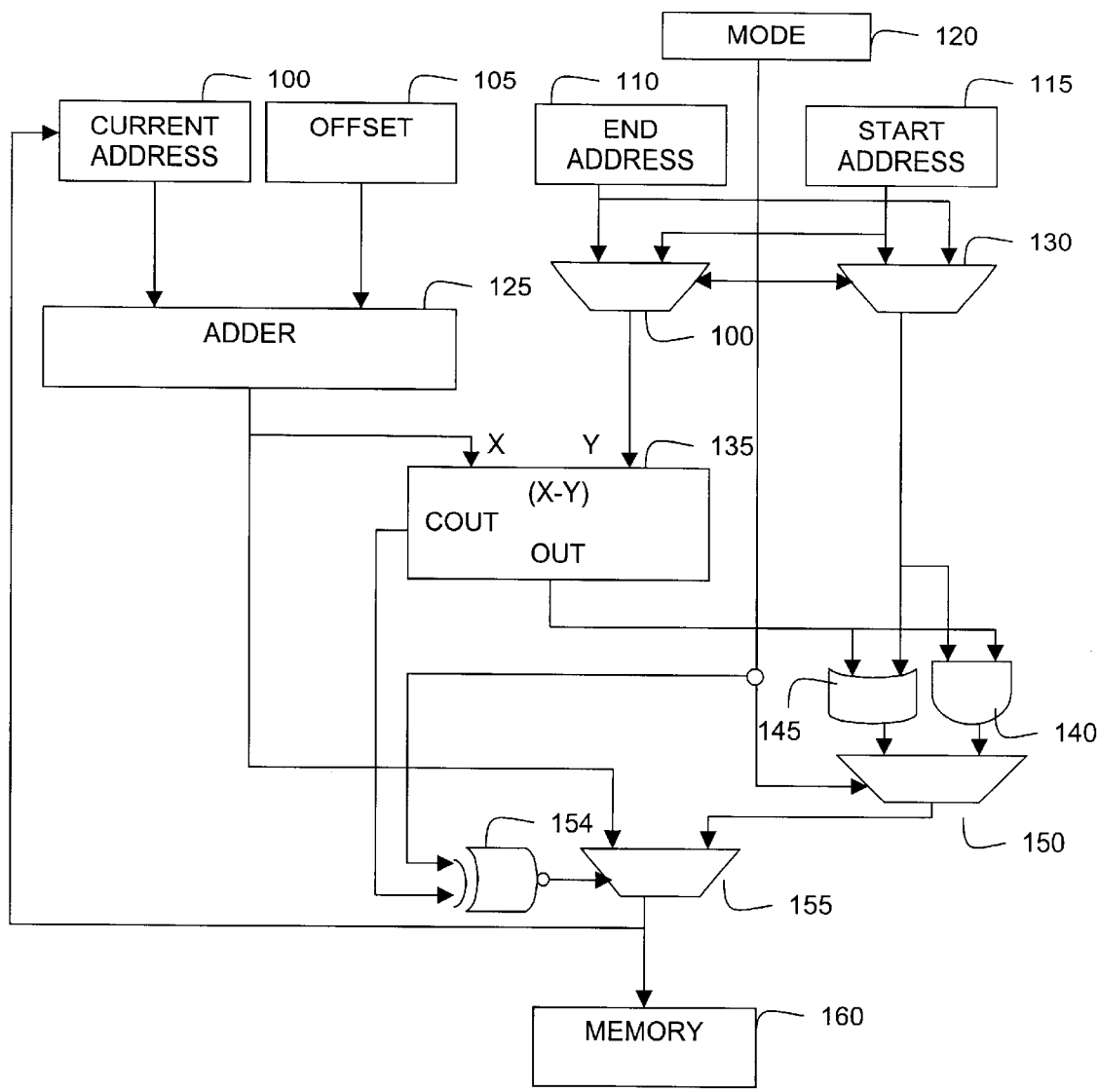
FIG. 1 depicts a circuit for generating modulo addresses according to an embodiment of the present invention.

FIG. 1 depicts a circuit for implementing modulo addressing according to an embodiment of the present invention. Referring to FIG. 1, registers store various values that are used to define the operation of the modulo address generator. The term registers as used herein is intended to encompass the use of registers, latches and memory. For example, a current address is stored in a register 100. The current address stores a pointer to a current address within the memory 160. An offset value is stored in a register 105. The offset determines how much the current address is offset by on successive cycles of modulo address generation. The offset may be a positive or negative value, may be one or another integer but is generally less than the length of the buffer within the memory 160.

The end and start addresses of the buffer are stored respectively in the registers 110 and 115. These addresses define the upper and lower boundaries of the buffer within the memory 160. The upper addresses should fall on power of two boundary for positive offsets and the lower addresses should fall on addresses having all ones for negative offsets so that a subtractor 135 with a carry out feature and simple a simple logical OR or logical AND address wrap technique may be implemented.

The mode bit 120 stores a zero or one and is indicative of the direction of offset of the current address. It will be understood that the mode bit may not be necessary in some embodiments and instead the value may be taken directly from the sign bit of the offset. In other words, the current address may be incremented or decremented by the offset. This determines whether the current address overflows the buffer out of the top (the start address) or the bottom (the end address).

An adder 125 adds the value in the current address register 100 to the value in the offset register 105 to obtain a sum. The sum is then fed into the X input of a subtractor 135 and to an input of a multiplexer 155.

A multiplexer 100 has inputs coupled to the registers 110 and 115 and an output coupled to the Y input of the subtractor 135. The multiplexer 100 also has a control input coupled to the mode bit 120. The value of the signal applied to the control input of the multiplexer 100 determines whether the value in the end address register 110 or the value in the start address register 115 is applied to the Y input of the subtractor 135.

The subtractor 135 subtracts the value Y from X, which is the next address (or the current address plus the offset value), to determine a difference and a carry. The difference may represent an absolute value minus one.

According to one embodiment of the invention, when the offset is positive and the mode bit is set accordingly, the next address is higher than the value in the current address register 100. This embodiment will now be described. Because the offset is positive, the next address pointer "moves" in the direction of the end address or overflows out of the end address of the buffer. In this mode, the multiplexer 100 is configured to apply the value from the end address register 115 to the Y input of the subtractor 135. The end address register contains the buffer end address plus one. The subtractor 135 then determines the difference between the next address and the end address and applies this difference signal to the inputs of OR logic 145 and AND logic 140. The subtractor 135 also determines whether or not there is a carry bit as a result of the subtraction.

The subtractor produces a carry signal that corresponds to the sign bit of the difference value. Accordingly, the carry signal is 1 when the difference is less than zero and the next address is within the buffer. The carry signal becomes positive when the difference is zero or greater than zero and the carry signal overflows the buffer. In a preferred embodiment, the start address is on a power of two boundary where the least significant n bits are zero. The length of the buffer is less than or equal to 2 to the n power buffer memory locations. The carry out bit forms the carry out signal that is applied to an input of an exclusive nor 154 which has its output coupled to the control input of a multiplexer 155. The carry out bit in this manner determines when the next address has overflowed a boundary of the buffer.

When the offset value is negative, the mode bit 120 is set accordingly and the value in the start address is applied to the subtractor 135. In this scenario, the end address must be an all ones value in the least significant n bits where the length of the buffer is less than or equal to 2 to the nth power buffer memory locations. The next address is less than the value in the current address register 100 and any overflows occur out the start address of the buffer. The difference signal accordingly is determined to be the start address subtracted from the next address and is applied to the AND logic 140 and the OR logic 145. The carry signal indicates a zero when the next address is greater than or equal to the start address and a one when the next address is less than the start address.

The multiplexer 130 is coupled to the end address and start address registers 110 and 115 respectively and has a control input coupled to the mode bit. When the mode bit indicates a positive offset, the multiplexer outputs the value in the start address register 115 to the inputs of the AND and OR logic. When the mode bit indicates a negative offset, the multiplexer 130 outputs the value in the end address register 110 to the inputs of the AND and OR logic.

The OR logic 145 takes the logical OR of the signals at its inputs. The AND logic 140 takes the logical AND of the signals at its inputs. The logical OR and the logical AND send outputs to the a multiplexer 150 which selectively applies either the output of the OR logic 145 or the output of the AND logic 140 to the multiplexer 155 based on the mode signal 120.

When the value in the mode register reflects a positive offset value, the multiplexer 150 selects the output of the OR logic to apply to the multiplexer 155. When the value in the mode register reflects a negative offset value, the multiplexer 150 selects the output of the logical OR to apply to the multiplexer 155.

The multiplexer 155 receives its control input from the exclusive nor 154 which performs an exclusive NOR on the carry out bit from the subtractor 135 and the mode bit according to the table below:

| Carry | Mode | Output |
| --- | --- | --- |
| 0 (wrap) | 0 | 1 |
| 1 (no wrap) | 0 | 0 |
| 0 (no wrap) | 1 | 0 |
| 1 (wrap) | 1 | 1 |

The multiplexer 155 also receives the next address at one of its inputs and the output of the multiplexer 150.

When the mode bit is zero and the carry bit is one and when the mode bit is one and the carry bit is zero, the multiplexer 155 selects the next address to use to access a buffer within the memory 100. The next address is also stored into the current address register 100 for subsequent use as the current address. In this scenario, the next address was within the start and end address of the buffer and no "wrapping" was necessary.

When the mode bit is zero and the carry bit is zero and when the mode bit is one and the carry bit is one, the multiplexer 155 selects the output of the mutiplexer 150 to use to access the memory 100 and to store into the current address register 100. The output of the multiplexer 150 is a wrapped address and represents an address value that has overflowed on side of the buffer and re-entered through the other with an offset value reflecting the amount of overflow. The examples below illustrate the wrapping operation.

EXAMPLE 1

Overflow Out of the Bottom or End Address

The offset is a positive value and the mode bit is set accordingly. The start address is on a power of two boundary. The multiplexer 100 selects and applies the end address value to the Y input of the subtractor 135 and the multiplexer 130 selects and applies the start address value to the inputs of the OR and AND logic.

During operation, the offset value is added to current address in the adder 125 to produce a next address that is applied to the subtractor 135. The subtractor determines the difference between the next address and the end address plus one by subtracting the end address plus one from the next address. When the difference is negative, the carry signal is one and the multiplexer 155 selects the next address (no wrapping) to access memory and update the current address register 100. When the difference is zero or positive, then the carry signal becomes zero and the multiplexer 155 selects a wrapped address.

The difference signal is applied to both the OR and the AND logic but the multiplexer 150 only selects the output of the OR logic 145 in this mode. The OR logic takes the logical OR between the start address and the difference signal. This logical OR produces the start address plus an offset that reflects the amount of overflow out the bottom of the buffer. If the overflow is by zero, then the logical OR produces the start address. If the overflow is by one, then the logical OR produces the start address plus one. This wrapped address is then selected by the multiplexer 155 and applied to the memory 160 and stored as the new current address in the current address register 100.

EXAMPLE 2

Overflow Out of the Top or Start Address

The offset is a negative value and the mode bit is set accordingly. The end address is on an all ones address boundary. The multiplexers 100 and 130 select and apply the end address value to the Y input of the subtractor 135 and to the inputs of the OR and AND logic.

During operation, the offset value is added to current address in the adder 125 to produce a next address that is applied to the subtractor 135. The subtractor determines the difference between the next address and the start address by subtracting the start address from the next address. When the difference is zero or a positive value, the carry signal is zero and the multiplexer 155 selects the next address (no wrapping) to access memory and update the current address register 100. When the difference is a negative value, then the carry signal becomes one and the multiplexer 155 selects a wrapped address.

The difference signal from the subtractor 135 is applied to both the OR and the AND logic but the multiplexer 150 only selects the output of the AND logic 145 in this mode. The AND logic takes the logical AND between the end address and the difference signal. This logical AND produces the end address minus an offset that reflects the amount of overflow out the top of the buffer. If the overflow is by one, then the logical AND produces the end address. If the overflow is by two, then the logical AND produces the end address minus one. This wrapped address is then selected by the multiplexer 155 and applied to the memory 160 and stored as the new current address in the current address register 100.

Figure 2:
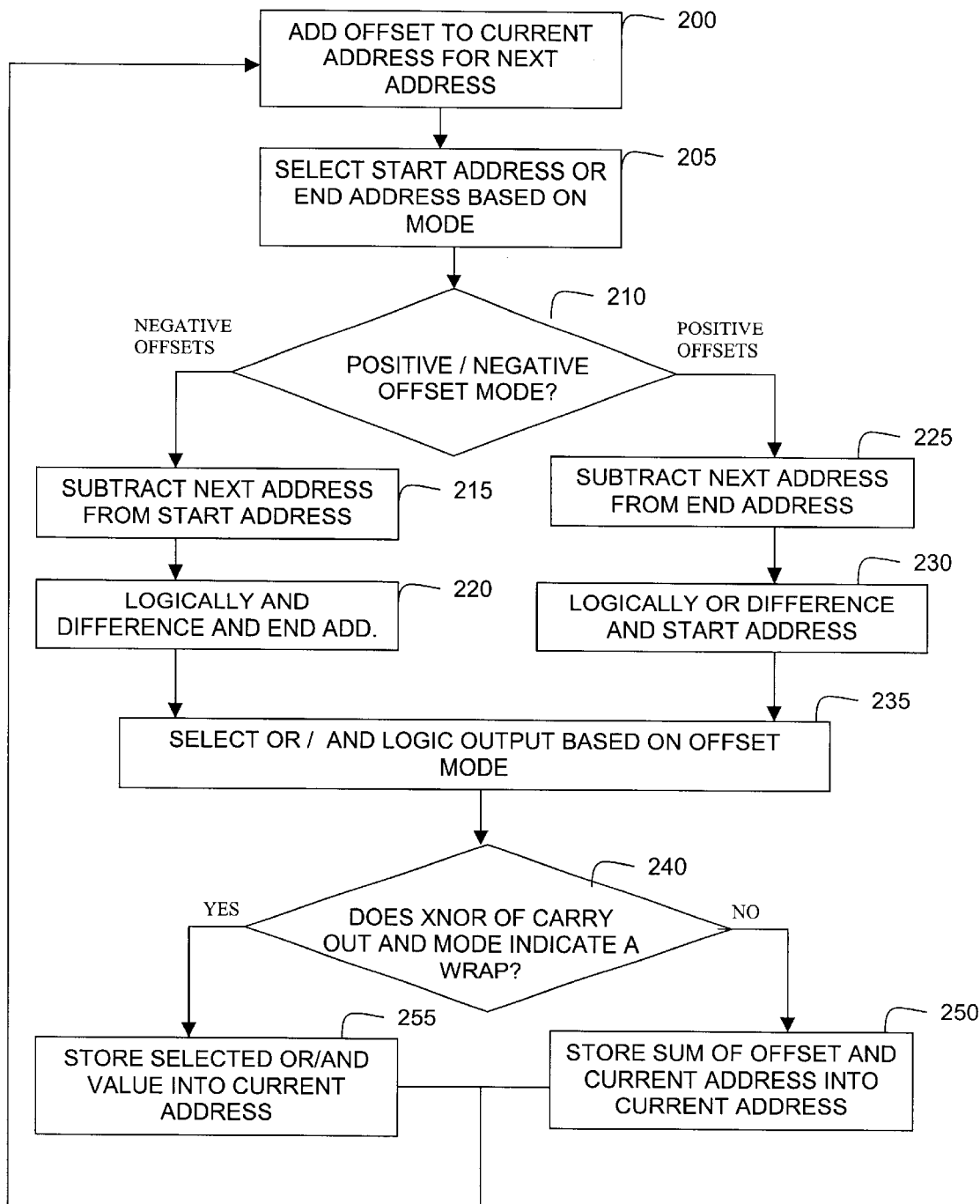
FIG. 2 depicts a method for generating modulo addresses according to another embodiment of the present invention.

FIG. 2 depicts a method of generating modulo addresses according to an embodiment of the present invention. Referring to FIG. 2, in step 200, a current address is added to an offset to produce a next address. In step 205, either the start address or the end address is selected for wrap address calculations based on a mode bit. The mode bit is set according to whether the offset value is positive or negative. When the offset is positive, the mode bit is set so that the start address is selected for wrap address calculations. When the offset is negative, the mode bit is set so that the end address is selected for wrap address calculations. In step 210, when the offset is positive, then step 215 begins, otherwise step 225 begins.

In step 215, the next address calculated in step 200 is subtracted from the start address and two values are produced, a difference value and a carry value. In step 220, a logical AND is generated between the difference value and the end address.

In step 225, the end address is subtracted from the next address and two values are produced, a difference value and a carry value. In step 230, a logical OR is generated between the difference value and the start address.

In step 235, either the output of the logical AND or the output of the logical OR is selected based on the mode signal. When the mode signal indicates a positive offset, the output of the logical OR is selected. When the mode signal indicates a negative offset, the output of the logical AND is selected.

In step 240, a determination is made as to whether or not the output of the XNOR 154 indicates a wrap address calculation is necessary. If so, then step 255 begins and a wrap address condition is present. If not, then step 250 begins. In step 250, the next address value calculated in step 200 is stored into the current address register and the next address may be used to access the buffer within the memory. If there is a wrap, then step 255 begins and the output of the OR/AND logic, whichever is selected in step 235, is stored into the current address register and may be used to access the buffer within the memory. Accordingly, in step 255, a wrapped address value is used to access the memory and to update the current address register.

While specific embodiments of the present invention have been disclosed, it will be understood by those having ordinary skill in the art that changes may be made to those embodiments without departing from the spirit and scope of the invention. The changes may include generating wrapped addresses using a hybrid scheme in which in one direction of buffer flow OR logic is used and in the other direction of buffer flow adder, comparator or other logic is used. Still other changes may be made to the AND and OR logic consistent with DeMorgan's theorem and the multiplexing arrangement may be implemented many different ways to achieve the same result. Still other changes in logic and polarity of signals may be made according to desired implementations.

What is claimed is:

1. A modulo addressing circuit, comprising:
   registers for storing a pointer, an offset, an end address and a start address;
   an adder for determining a sum of the pointer and the offset;
   a subtractor for determining a difference between the pointer value and a selected one of the start and end addresses and producing a carry signal on an overflow;
   OR logic for calculating a logical OR between the difference and the selected address; and
   a multiplexer for storing the logical OR into the pointer when a carry signal indicates an overflow out of the end address.

2. The circuit according to claim 1, wherein the multiplexer stores the sum into the pointer when the carry signal does not indicate an overflow.

3. The circuit according to claim 1, further comprising:
AND logic for calculating a logical AND between the difference and the selected address; and
a multiplexer for storing the logical AND into the pointer when the carry signal indicates an overflow out of the start address.

4. The circuit according to claim 3, wherein the multiplexer stores the sum into the pointer when the carry signal does not indicate an overflow.

5. The circuit according to claim 1, wherein a mode bit determines the selected address.

6. The circuit according to claim 5, wherein the selected address is the start address.

7. The circuit according to claim 3, wherein a mode bit determines the selected address.

8. The circuit according to claim 7, wherein the selected address is the end address.

9. A method of generating modulo addresses, comprising:
calculating a sum of a current address and an offset;
subtracting a start address from the sum to determine a difference and a carry;
generating a logical OR between the difference and the start address; and
selecting either the sum or the logical OR generated as a new current address based on the carry.

10. The method according to claim 9, further comprising:
using the new current address to access a buffer within a memory.

11. The method according to claim 10, further comprising:
saving the new current address as the current address.

12. The method according to claim 11, further comprising:
selecting the end address for use in the subtracting and generating steps based on a mode bit.

13. A method of generating modulo addresses, comprising:
calculating a sum of a current address and an offset;
subtracting an end address from the sum to determine a difference and a carry;
generating a logical AND between the difference and the end address; and
selecting either the sum or the logical AND generated as a new current address based on the carry.

14. The method according to claim 13, further comprising:
using the new current address to access a buffer within a memory.

15. The method according to claim 14, further comprising:
saving the new current address as the current address.

16. The method according to claim 15, further comprising:
selecting the start address for use in the subtracting and generating steps based on a mode bit.

17. The method according to claim 16, wherein the mode bit is the sign bit of the offset.

18. The method according to claim 16, wherein the mode bit reflects the sign bit of the offset.

* * * * *